United States Patent [19]
Dankoff et al.

[11] 3,865,629
[45] Feb. 11, 1975

[54] RECLAMATION OF COMPONENTS FROM GRINDING SWARF

[76] Inventors: Joseph Daniel Dankoff, P.O. Box 79, R. D. No. 5; David Kent Snyder, 1167 Ridgeview Dr., both of Latrobe, Pa. 15650

[22] Filed: Nov. 7, 1972

[21] Appl. No.: 304,385

[52] U.S. Cl.......................... 134/19, 134/12, 134/26, 134/40, 209/3, 209/11, 209/214
[51] Int. Cl......... B08b 3/10, B03b 7/00, B03c 1/00
[58] Field of Search ............... 134/2, 41, 42, 10, 40, 134/25 R, 12, 19, 26; 75/.5 AA, 28; 241/24; 209/38, 214, 11, 3

[56] References Cited
UNITED STATES PATENTS

| | | | |
|---|---|---|---|
| 2,354,727 | 8/1944 | Wulff................................ | 241/24 X |
| 2,385,564 | 9/1945 | Booth et al. .......................... | 134/12 |
| 2,394,578 | 2/1946 | Wulff.................................... | 209/214 |
| 2,714,574 | 8/1955 | Kearney............................. | 134/25 R |
| 3,544,369 | 12/1970 | Keogh...:............................. | 134/10 X |
| 3,610,260 | 10/1971 | Kearney................................ | 134/12 |
| 3,639,172 | 2/1972 | Keogh............................... | 134/10 X |

Primary Examiner—S. Leon Bashore
Assistant Examiner—Richard H. Tushin
Attorney, Agent, or Firm—Parmelee, Miller, Welsh & Kratz

[57] ABSTRACT

A process for the recovery of components of grinding swarf comprises screening the swarf when necessary, mixing and washing it with a hydrophilic solvent and the removal of the bulk of the resulting solution therefrom, followed by the mixing and washing one or more times with a second solvent for grease and oil, with the separation of the bulk of the resulting solution and the removal of the remaining trace of such solution by volatization at elevated temperature. Depending on the component to be recovered, magnetic separation of the steel from abrasive substances may be affected at some stage, and abrasive grains of different composition may be separated, and lubricant can be recovered from the second solvent as this solvent is prepared for reuse.

6 Claims, 1 Drawing Figure

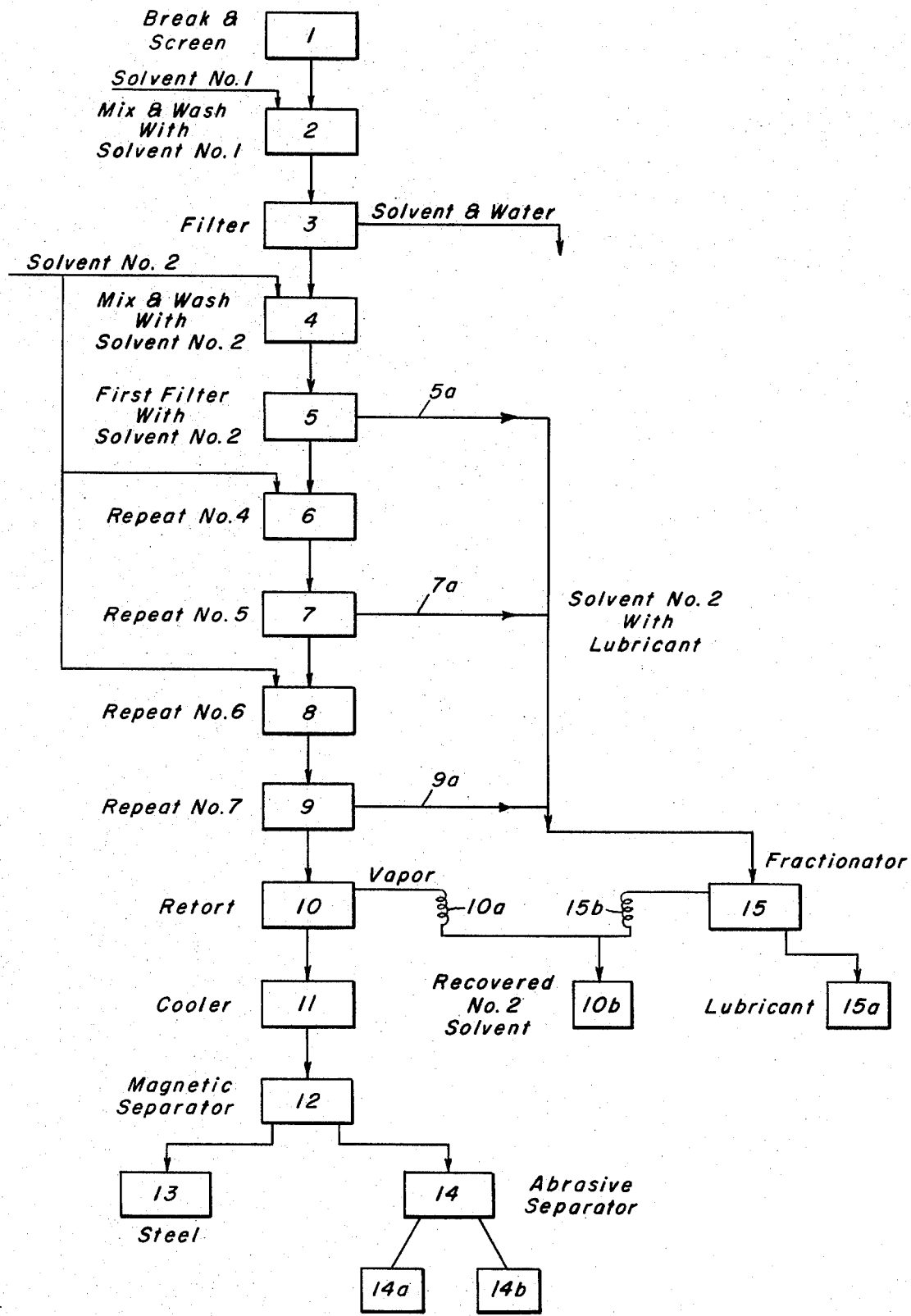

RECLAMATION OF COMPONENTS FROM GRINDING SWARF

This invention relates to the processing of grinding swarf produced in the manufacture of certain steel products for the recovery therefrom, in a condition for reuse, the steel particles, and less importantly, the abrasive particles and lubricant that is contained in the lubricant-coolant emulsion that is used in the grinding operation.

In various processes for manufacturing some steel products or parts of apparatus, abrasive grinding operations are used, largely with the use of a liquid lubricant-coolant. Large quantities of waste are produced, comprising steel particles, abrasive particles and containing lubricant-coolant residue. The waste, which often includes high quality steel particles, is known as "swarf" or "grinding swarf" and has little value because it cannot be economically recycled to provide useful products.

The present invention comprises a method for the separate recovery from grinding swarf of steel, and of perhaps less importance, abrasive particles and lubricant.

The lubricant-coolant most commonly used is a combination, often a proprietary product, in the nature of an emulsion of a mineral oil and water. This residue of lubricant-coolant in the swarf has presented one major obstacle to the recycling of the steel contained in the swarf, and the present invention provides a method by which it is substantially entirely removed from either the steel particles only or both the steel particles and the abrasive particles.

According to the preferred embodiment of this invention, the swarf, which may have agglomerated in storage in irregular lumps, is first ground and screened to break up the lumps and remove foreign bodies, such as pieces of scrap metal. The screened swarf is then intimately mixed with a hydrophilic solvent, such as methanol which dissolves water and other components from the adherent lubricant-coolant that is retained on the particles but which does not dissolve the lubricant, at least to any appreciable extent.

After separation of this solvent, sometimes herein referred to as the first solvent, from the mixture, as for example by filtering, the swarf, now free, for all practical purposes of water is washed with a solvent for oil and grease, such as kerosene, that dissolves the lubricant from which the water has been removed but which cannot be adequately effective where the lubricant is present with water. This solvent is sometimes herein referred to as the second, or No. 2 solvent. Washing with the second solvent is preferably repeated two or more times with the removal of the bulk of the solvent with dissolved lubricant after each washing by filtering or otherwise, and after the final washing, if not the others, as much as possible of the solvent with contained lubricant as is feasible is removed by filtering or other liquid-solid separation steps.

After the final washing with the second solvent where there will nevertheless be some solvent retained in the mass, the material is then heated in a retort to vaporize the residual second solvent. The metal and abrasive particles may then be magnetically separated and the steel is then available for use in powdered metallurgy or for other commercial purposes. Likewise, the abrasive, if comprised of mixed grits, such as silicon carbide and aluminum oxide, may be separated, as for example, by electrostatic separation, and reused. The kerosene may be freed of lubricant for reuse as the second solvent by known procedures, such as fractionation, while recovering the lubricant as a commercial product. Where only the steel component is to be recovered, magnetic separation may precede either the first or second washings, but especially after any of the second solvent washings, but important in any case is the preliminary removal of water, preferably a first solvent followed by a second solvent, the first of which will selectively remove water, leaving the lubricant in a condition to then be effectively dissolved by the second solvent. Heat could be used to remove the water by vaporization, but the use of methanol to extract the water is commercially more feasible in most cases.

The accompanying drawing is a flow diagram of the preferred method illustrating the successive steps of the most complete procedure.

In the drawing, 1 designates a lump breaking and screening apparatus where agglomerated masses of swarf are broken down to a size where the material may be effectively washed and foreign bodies, such as stray pieces of iron or steel are removed. The screened material is discharged from screening unit 1 into the first mixer and washer 2 where it is mixed and agitated with the first solvent, designated in the drawing as the No. 1 solvent. This solvent is a hydrophilic solvent, methanol being a desirable first solvent, but other solvents for water, but not for grease or oil, may be used, ethanol and isopropyl alcohols being other examples.

After being thoroughly washed with its first solvent, the mixure is transferred to a filter or separator 3. The filter may be of a well-known type where air pressure or vacuum is used. The bulk of the solvent-water solution is removed from the swarf in this filter and the swarf as indicated at 4, is then mixed for the first time with the grease and oil solvent, that is, the second solvent. This second solvent is kerosene or some other hydrocarbon solvent, preferably one which is not too explosive or dangerous, or perhaps a chlorinated hydrocarbon, such as trichlorethylene, trichloroethane and carbon tetrachloride. Kerosene being relatively inexpensive and quite safisfactory, we shall refer to the second solvent as kerosene, but without exclusion of other mineral oil solvents, unless otherwise indicated.

After this first mixing and washing with the second solvent, the mixture is processed to remove the bulk of the kerosene-lubricant solution, as for example, by filtering under pressure or vacuum as indicated at 5. The filtrate is removed at 5a. As previously indicated, two or more washings with kerosene are desirable, and 6 designates another mixing and washing stage. The second mixture is also processed at 7 to remove the bulk of the solvent with additional lubricant, again filtering under pressure or vacuum, and then the filtrate removed at 7a. Generally a third mixing with the second solvent is desirable. This is indicated at 8 and the bulk of the solvent is again extracted, desirably by pressurized or vacuum filtering, indicated at 9. The filtrate is removed at 9a.

Since the final step of filtering cannot completely remove every trace of solvent and lubricant, the residue from the third filtering step, which may perhaps be described as "kerosene moist" solid residue, is sealed inside an air-tight retort and heated from an external heat source until this last trace of kerosene-lubricant mixture is substantially entirely, if not completely eliminated. This occurs when the mass reaches a range between 600° F. and 1,000° F. In the flow diagram, 10 designates this step. Vapors from the retort may be conducted to a condenser 10a and the condensate collected in a receiving vessel 10b.

The dried and degreased solids are cooled at 11 and then at 12 processed through a magnetic separator with the steel particles being collected in receiver 13 and the abrasive particles into receiver and/or separator 14. Normally these abrasive particles will be a mixture of silicon carbide and aluminum oxide and for reuse, they may be electrostatically separated by known methods, the separated particles being discharged at 14a and 14b respectively.

The filtrate removed at 5a, 7a and 9a may be carried through a common duct to a fractionating unit or other equipment known in the petroleum refining industry as indicated at 15 to separate the kerosene and the lubricant. The kerosene from which the lubricant has been stripped is discharged through 15b to the solvent receiver 10b and the lubricant collected in a receiver 15a.

As indicated above, the order of the steps, especially insofar as magnetic separation is involved may be varied, particularly if the recovery of steel particles only should be important. For example, the magnetic separation may occur following the removal of water from the swarf, such that the subsequent steps then apply only to the steel particles. In many instances, the grinding swarf results from the grinding of specialty steels or steel alloys, tool steel, for example, being one of these, and the recovered steel particles may be highly useful in powdered metallurgy or some other sintering or forming operation and often it is briquetted for further use. In a typical grinding swarf resulting from high speed tool steel, the content averaged about 75 percent steel particles 20 percent to 23 percent abrasive particles and the remainder was the lubricant-coolant mixture.

We claim:

1. In the method of recovering for reuse the steel component of grinding swarf produced where a coolant lubricant is used in the grinding process, the steps which comprise initially extracting water including the water phase of any contained coolant-lubricant compound contained in the swarf with a first solvent, and separating at least most of the solution of first solvent with the extracted water so produced thereby providing a mixture of substantially water-free steel and abrasive particles with lubricant, then in the following order mixing and washing the particles freed of the water content with a second solvent for lubricant to remove at least all but a trace of lubricant therefrom and separating the bulk of the second solvent with dissolved lubricant from the particles, heating the particles in a closed environment to vaporize any residuum of the second solvent and lubricant on the particles and removing the vapors so produced from said environment and cooling the particles, and magnetically separating the steel particles from the abrasive particles at some stage in the foregoing procedure following the removal of water, whereby the procedure following the removal of water applies to all particles until magnetic separation is effected and thereafter to only the steel particles.

2. The method defined in claim 1 in which the steel particles are separated from the abrasive particles only after the step of heating of the particles in a closed environment has been concluded.

3. The method defined in claim 2 in which the mixing of the steel and abrasive particles with the second solvent followed by the removal of the bulk of the solvent with dissolved lubricant, is repeated not less than two more times before the steel particles with associated abrasive particles are heated in the enclosed environment.

4. The method defined in claim 3 in which the first solvent is an alcohol selected from the group consisting of methanol, ethanol, and isopropyl alcohol, and the second solvent is selected from the group consisting of kerosene, carbon tetrachloride, trichloroethane, and trichloroethylene.

5. The method defined in claim 1 in which the magnetic separation occurs after the cooling of the steel and abrasive particles, the mixing of the steel particles and abrasive with the second solvent followed by the removal of the bulk of the solvent with dissolved lubricant is repeated at least twice.

6. The method of separating steel and abrasive particles from grinding swarf at least a part of which was produced by an abrasive grinding operation in which a lubricant-coolant has been used comprising in order the steps of breaking agglomerated lumps of the swarf and screening it, mixing and washing the screened swarf with a hydrophilic solvent in which the lubricant is substantially insoluble to thereby dissolve any water in the swarf that may be either free or emulsified with lubricant, separating the bulk of the resulting solution from the swarf, then repeatedly mixing and washing the swarf with a second solvent which is a solvent for the lubricant phase of the lubricant-coolant and after each such mixing and washing separating the bulk of the solvent with any dissolved lubricant from the swarf, heating the swarf after such repeated washings in a closed environment to a temperature in the range of 600° F. until any residue of the second solvent and residue of lubricant has been vaporized while also generating a non-oxidizing atmosphere in the closed environment and which is subsequently removed from said environment and cooling and magnetically separating the steel particles and the abrasive particles.

* * * * *